(12) United States Patent
Raskar

(10) Patent No.: US 11,692,763 B2
(45) Date of Patent: Jul. 4, 2023

(54) INSULATION MATERIALS FOR A VACUUM INSULATED STRUCTURE AND METHODS OF FORMING

(71) Applicant: WHIRLPOOL CORPORATION, Benton Harbor, MI (US)

(72) Inventor: Devidas B. Raskar, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/085,176

(22) Filed: Oct. 30, 2020

(65) Prior Publication Data

US 2022/0136762 A1 May 5, 2022

(51) Int. Cl.
| | | |
|---|---|---|
| *F16L 59/065* | (2006.01) | |
| *F25D 23/06* | (2006.01) | |
| *E04B 1/80* | (2006.01) | |

(52) U.S. Cl.
CPC ............ *F25D 23/063* (2013.01); *E04B 1/803* (2013.01); *F25D 23/065* (2013.01); *F16L 59/065* (2013.01); *F25D 2201/14* (2013.01)

(58) Field of Classification Search
None
See application file for complete search history.

(56) References Cited

U.S. PATENT DOCUMENTS

| | | | |
|---|---|---|---|
| 3,179,549 A | 4/1965 | Strong et al. | |
| 3,289,423 A | 12/1966 | Berner et al. | |
| 4,514,450 A | 4/1985 | Nowobilski et al. | |
| 5,032,439 A | 7/1991 | Glicksman et al. | |
| 5,199,484 A * | 4/1993 | Schatz | F28D 20/021 220/592.2 |
| 5,327,703 A | 7/1994 | Cur et al. | |
| 5,512,345 A * | 4/1996 | Tsutsumi | F25D 23/063 220/592.27 |
| 8,281,558 B2 | 10/2012 | Hiemeyer et al. | |
| 9,151,435 B2 | 10/2015 | Lee et al. | |
| 9,464,751 B2 | 10/2016 | Toshimitsu et al. | |
| 10,006,581 B2 | 6/2018 | Kuhn et al. | |
| 10,274,247 B2 | 4/2019 | Jeong et al. | |
| 10,584,914 B2 | 3/2020 | Jung et al. | |
| 2006/0076863 A1* | 4/2006 | Echigoya | F16L 59/065 312/401 |
| 2011/0047934 A1 | 3/2011 | Brown | |

(Continued)

FOREIGN PATENT DOCUMENTS

| | | |
|---|---|---|
| EP | 0658717 B1 | 3/1998 |
| EP | 2614193 B1 | 7/2015 |

(Continued)

OTHER PUBLICATIONS

Machine translation of WO-2011058678, 2021.*

*Primary Examiner* — Alexander S Thomas
(74) *Attorney, Agent, or Firm* — Price Heneveld LLP

(57) ABSTRACT

A vacuum insulated structure and method of forming are provided. The vacuum insulated structure includes an inner liner and an outer wrapper coupled to the inner liner and defining an insulating cavity. A plurality of insulation packages are disposed within the insulating cavity. Each insulation package includes a first filler material contained within an envelope. A second filler material is disposed within the insulating cavity.

20 Claims, 4 Drawing Sheets

(56) References Cited

U.S. PATENT DOCUMENTS

2012/0103006 A1\* 5/2012 Jung .................... F25D 23/067
                                                                      62/440
2018/0339490 A1    11/2018 Park et al.

FOREIGN PATENT DOCUMENTS

| EP | 2789951 B1 | 10/2020 | | |
|---|---|---|---|---|
| JP | 04198688 A | 7/1992 | | |
| JP | H0882474 A | 3/1996 | | |
| JP | 2009287791 A | 12/2009 | | |
| KR | 101012664 B1 | 2/2011 | | |
| WO | WO-2011058678 A1 | * | 5/2011 | ............ F25D 23/02 |
| WO | 2012004901 A1 | 1/2012 | | |
| WO | 2012031789 A1 | 3/2012 | | |
| WO | 2014195298 A1 | 12/2014 | | |

\* cited by examiner

INSULATION MATERIALS FOR A VACUUM INSULATED STRUCTURE AND METHODS OF FORMING

BACKGROUND OF THE DISCLOSURE

The present disclosure generally relates to insulation materials for use in vacuum insulated structures, and more specifically, to insulation materials for use in vacuum insulated structures used in appliances, such as refrigerators and freezers, and methods of forming said insulation materials.

SUMMARY OF THE DISCLOSURE

According to one aspect of the present disclosure, a vacuum insulated structure includes an inner liner and an outer wrapper coupled to the inner liner and defining an insulating cavity. A plurality of insulation packages are disposed within the insulating cavity. Each insulation package comprises a first filler material contained within an envelope. A second filler material is disposed within the insulating cavity.

According to another aspect of the present disclosure, a method of forming a vacuum insulated structure is provided. The method includes sealing an inner liner with an outer wrapper to form an insulating cavity. A plurality of insulation packages are disposed within the insulating cavity, each of the plurality of insulation packages including a first filler material contained within an envelope. The method includes supplying a second filler material to the insulating cavity through at least one filling port and evacuating air from the insulating cavity through at least one vacuum port.

According to yet another aspect of the present disclosure, a hybrid insulation structure includes an inner liner sealed with an outer wrapper to form an insulating cavity. A plurality of insulation packages are disposed within the insulating cavity and extend between the inner liner and the outer wrapper. Each insulation package includes a first filler material contained within an envelope. A second filler material is disposed within the insulating cavity and surrounds the plurality of insulation packages, wherein the second filler material is different than the first filler material.

These and other features, advantages, and objects of the present disclosure will be further understood and appreciated by those skilled in the art by reference to the following specification, claims, and appended drawings.

Figure 1:
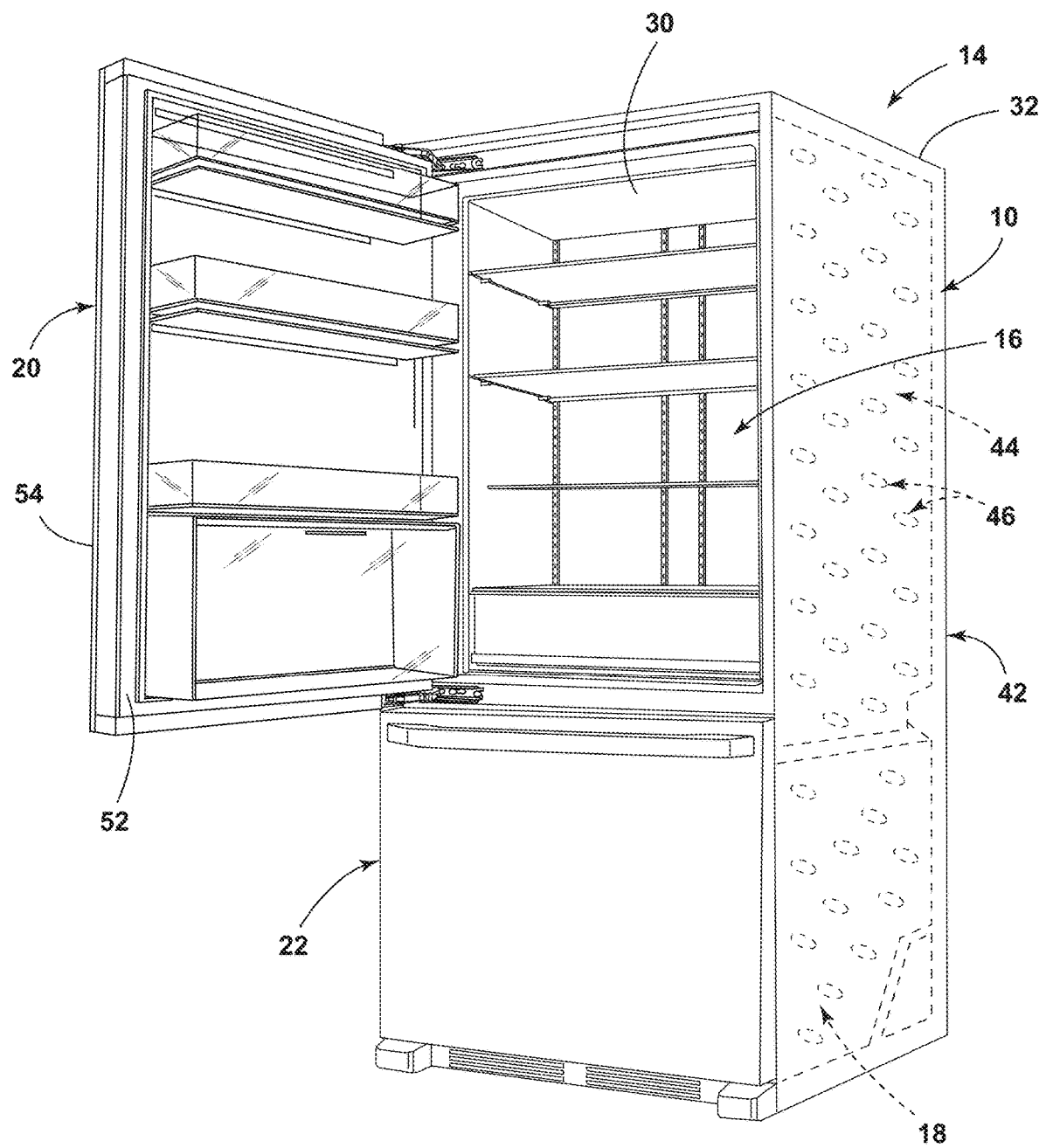
FIG. 1 is a front perspective view of an appliance including a vacuum insulated structure, according to the present disclosure.

The components in the figures are not necessarily to scale, emphasis instead being placed upon illustrating the principles described herein.

DETAILED DESCRIPTION

The present illustrated embodiments reside primarily in combinations of apparatus components and method steps relating to insulation materials for use in vacuum insulated structures, such as may be used in insulating home appliances. Vacuum insulated structures may be utilized in appliances to limit or control the transfer of heat and/or sound. It can be challenging to identify materials that provide the desired thermal conductivity and which can be compacted efficiently to achieve the desired final vacuum density in the vacuum insulated structure. In some applications, it can be challenging to achieve a desired final vacuum density while also avoiding damage or deformation to the vacuum insulated structure (e.g., avoiding bowing of the walls of the vacuum insulated structure). For example, a conventional vacuum insulated structure includes first and second walls sealed together to define an insulating cavity. The insulating cavity is evacuated, for example using a vacuum pump, to decrease the pressure within the insulating cavity relative to ambient pressure and thus form a vacuum insulated structure. However, in some cases, the process of decreasing the pressure within the insulating cavity (also referred to as drawing the vacuum) can result in deformation of one or more walls defining insulating cavity as the decreasing vacuum draws the walls inward (referred to as bowing). When the insulating cavity is filled with an insulative filler material, characteristics of the filler material, such as the distribution of the filler material within the insulating cavity and the compressibility of the filler material, may affect the likelihood of deformation of the structure walls during evacuation. For example, a density gradient as a result of uneven compaction of the filler material and/or a filler material having a high compressibility (e.g., greater than 15%) may increase the likelihood of deformation of the structure walls during evacuation. While increasing the density of the filler material and/or selecting a filler material with a lower compressibility can offset these challenges in some applications, these materials may undesirably affect the performance of the vacuum insulated structure, such as the thermal conductivity, for example.

Aspects of the present disclosure provide an insulation system that includes a plurality of insulation packages that contain a first filler material disposed within an envelope. The insulation packages can be disposed within the insulating cavity, between the walls forming the vacuum insulation structure, such that the insulation packages physically restrict inward movement of the structure walls (i.e., bowing) during evacuation of the insulating cavity by more than a predetermined amount. The insulation packages can be used in combination with a second filler material that is disposed within the space around the insulation packages to provide the vacuum insulation structure with a desired thermal conductivity. The first filler material contained within the insulation packages can be selected in concert with the second filler material to contribute to providing the vacuum insulation structure with a desired thermal conductivity.

Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front"

shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
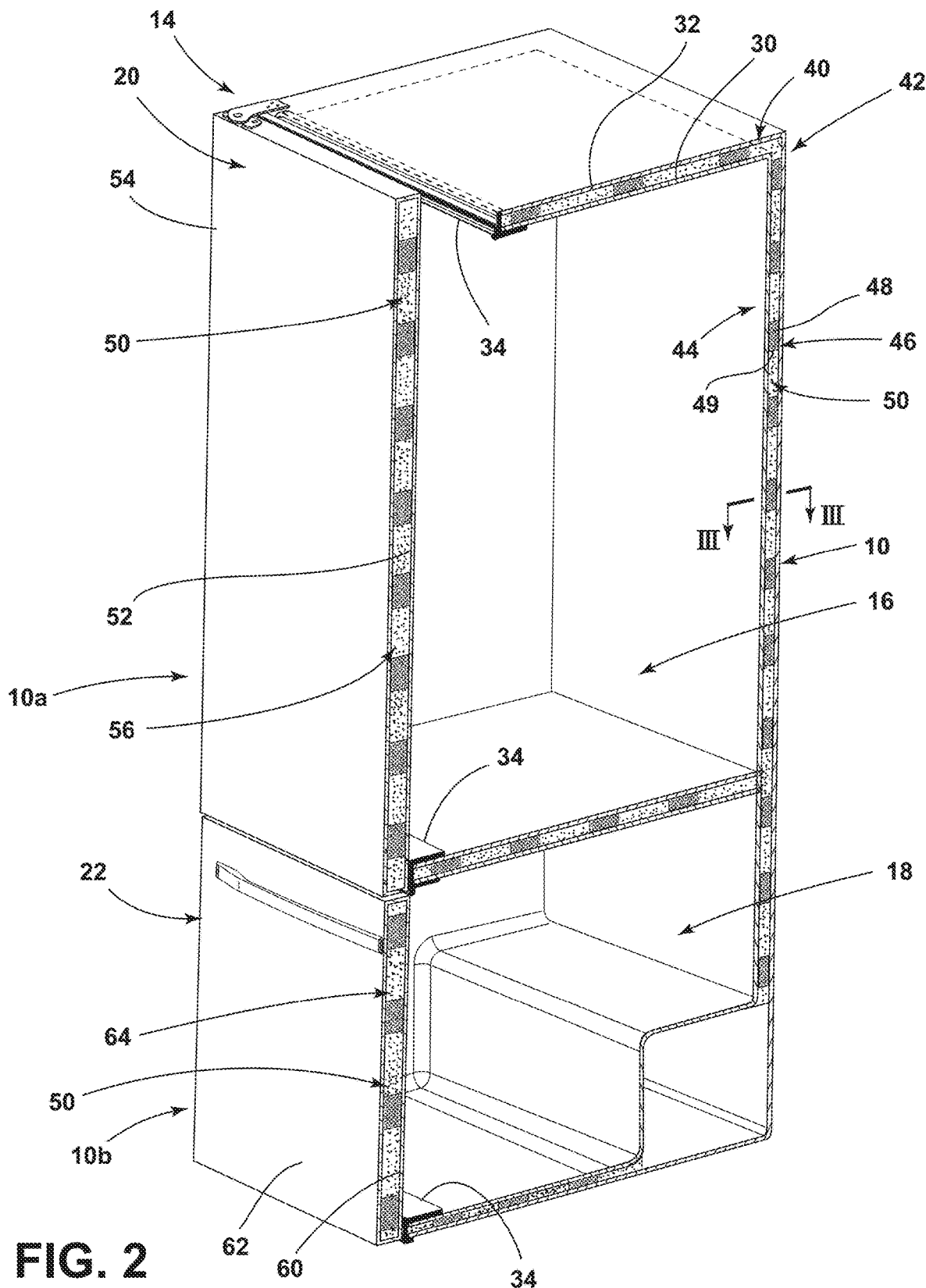
FIG. 2 is a cross-sectional view of the appliance of FIG. 1, according to the present disclosure.
Figure 3:
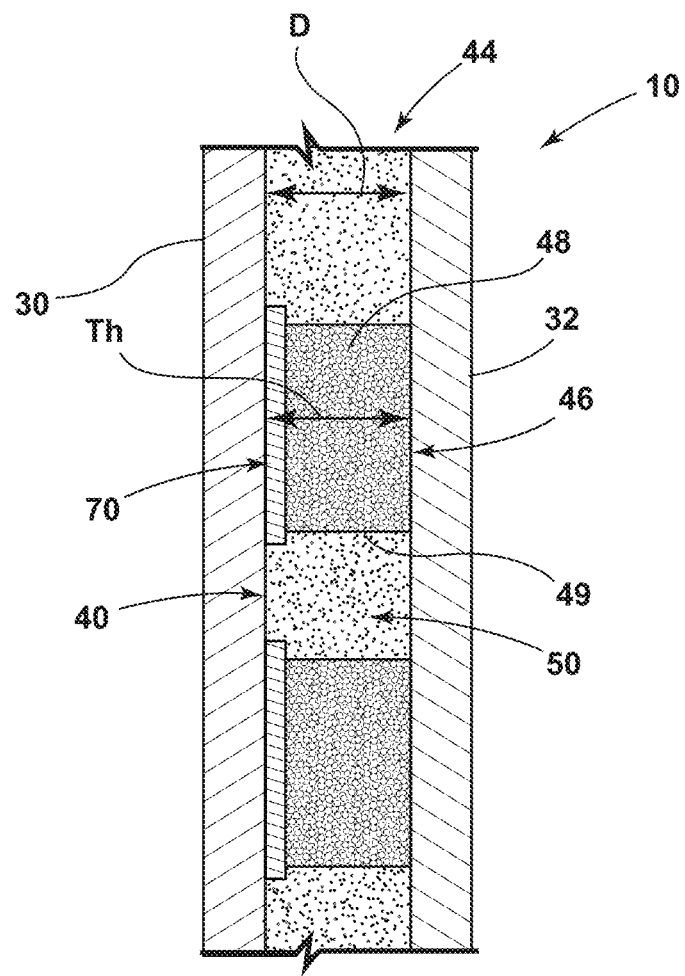
FIG. 3 is a cross-sectional view of a portion of the appliance of FIG. 2 taken along the line III-III, according to the present disclosure.

Referring to FIGS. 1-3, aspects of the present disclosure relate to a vacuum insulated structure 10 that includes an inner liner 30 and an outer wrapper 32 coupled to the inner liner 30 and defining an insulating cavity 40. A plurality of insulation packages 46 are disposed within the insulating cavity 40. Each insulation package 46 comprises a first filler material 48 contained within an envelope 49. A second filler material 50 is disposed within the insulating cavity 40.

Referring to FIGS. 1-2, reference numeral 10 generally designates a vacuum insulated structure in the form of a refrigerating appliance 14. The vacuum insulated structure 10 of the present disclosure may be in the form of a vacuum insulated structural cabinet, as illustrated, or a vacuum insulated panel that may be used as an insulation member for the appliance 14. The appliance 14 can be in the form of a refrigerating appliance having a refrigeration compartment 16 and a freezer compartment 18, as illustrated. The appliance 14 can include first and second insulated door assemblies 20 and 22 for selectively providing access to the refrigeration compartment 16 and the freezer compartment 18, respectively. The first and second insulated door assemblies 20 and 22 can be configured to rotate and/or slide between an open and closed position with respect to the appliance 14 to allow for selective access to the refrigeration compartment 16 and the freezer compartment 18, respectively. The appliance 14 can have additional components based on the type of appliance, the details of which are not germane to the aspects of the disclosure, examples of which include a controller, user interface, lights, a compressor, a condenser, an evaporator, an ice maker, a water dispenser, etc. The appliance 14 can also be in the form of a refrigerating appliance including only a refrigeration compartment, only a freezer compartment, or any various combinations and configurations thereof. For example, in non-limiting examples, the refrigerating appliance can be a bottom mount refrigerator, a bottom mount French door refrigerator, a top mount refrigerator, a side-by-side refrigerator, a four-door French door refrigerator, and/or a five door French door refrigerator. While the vacuum insulated structure 10 is described in the context of a refrigerating appliance, it is understood that the vacuum insulated structure 10 can be used in a variety of appliances, examples of which include ovens, dishwashers, water heaters, laundry appliances, and any other appliances that may benefit from thermal and/or sound insulation.

The vacuum insulated structure 10 can include an inner liner 30 coupled with an outer wrapper 32 to define an insulating cavity 40 of a cabinet body 42 of the appliance 14. In some embodiments, a trim breaker 34 can be provided for coupling the inner liner 30 with the outer wrapper 32, as illustrated. The inner liner 30, outer wrapper 32, and optional trim breaker 34, can be considered a structural wrapper that defines the insulating cavity 40. An insulation system 44 is disposed in the insulating cavity 40. The insulation system 44 includes a plurality of insulation packages 46 containing a first filler material 48 encased within an envelope 49. The insulation system 44 can also include a second filler material 50 disposed within the insulating cavity 40 in the space between the insulation packages 46. According to one aspect of the present disclosure, the insulation system 44 including a combination of the insulation packages 46 and the second filler material 50 can be referred to as a hybrid insulation system, which, together with the inner liner 30 and the outer wrapper 32 form a hybrid insulation structure.

In some aspects, the first and/or second insulated door assemblies 20 and 22 can include a vacuum insulated structure 10a and 10b, respectively, that includes the insulation system 44 as described with respect to the vacuum insulated structure 10. The structure and/or materials of the inner liner and outer wrapper components of the first and second insulated door assemblies 20 and 22 defining the insulating cavity within which the insulation system 44 can be housed may be different than those of the body of the appliance 14, and thus are labeled with the suffix "a" and "b." The first insulated door assembly 20 can include a first door inner liner 52 and a first door outer wrapper 54, which together define a first door insulating cavity 56. The second insulated door assembly 22 can include a second door inner liner 60 and a second door outer wrapper 62, which together define a second door insulating cavity 64. The insulation system 44 may be present in one or both of the first and second door insulating cavities 56, 64. In some aspects, the insulation system 44 may be the same in the insulating cavity 40 and the first and second door insulating cavities 56, 64. In other aspects, at least one of the insulating cavity 40, the first door insulating cavity 56, and the second door insulating cavity 64 may have a different insulation system 44 and/or different insulation material than the other of the insulating cavity 40, the first door insulating cavity 56, and the second door insulating cavity 64. In some aspects, one or both of the first and second insulated door assemblies 20, 22 does not include the vacuum insulated structure 10a, 10b. Optionally, the first and second insulated door assemblies 20, 22 may include an aesthetic exterior skin (not shown).

The inner liner 30, outer wrapper 32, optional trim breaker 34, first and second door inner liners 52, 60, and first and second door outer wrappers 54, 62, can be made from any suitable metal, metal-alloy, and/or polymeric material, and may be the same or different. The inner liner 30, outer wrapper 32, and optional trim breaker 34 can be made from materials suitable for maintaining a vacuum within the insulating cavity 40 (i.e., maintain a predetermined lower pressure within the insulating cavity 40, relative to ambient pressure). When the first and second insulated door assemblies 20, 22 include the vacuum insulated structure 10a, 10b, the first and second door inner liners 52, 60, and first and second door outer wrappers 54, 62 can be made from materials suitable for maintaining a vacuum within the respective first and second door insulating cavities 56, 64.

While aspects of the insulation system 44 are described with respect to the vacuum insulated structure 10 used to form the cabinet body 42 of the appliance 14, it will be understood that aspects of the insulation system 44 can be used with one or both of the vacuum insulated structures 10a, 10b of the first and second insulated door assemblies 20, 22, respectively.

Referring now to FIG. 3, the insulation system 44 includes a plurality of insulation packages 46 containing a first filler material 48. The first filler material 48 can include any suitable insulating material, non-limiting examples of which include fumed silica, perlite, precipitated silica, aerogel powder, silicon carbide, carbon black powder, graphite, rice husk, ash powder, diatomaceous earth, cenospheres, glass fiber, glass microspheres, and combinations thereof. The first filler material 48 can optionally include one or more additives, non-limiting examples of which include opacifiers, colorants, electrical conductivity additives, radiant energy reflectivity additives, infrared absorbing additives, etc. The first filler material 48 is contained within the envelope 49, which can be made from any suitable material capable of maintaining the first filler material 48 within the volume defined by the envelope 49. Non-limiting examples of suitable materials for the envelope 49 include woven or non-woven natural and synthetic textiles, fabric, fleece, glass fiber fleece, and polymeric materials. The envelope 49 can be formed into any desired regular or irregular geometric shape to provide each insulation package 46 with the desired dimensions and cross-sectional shape. Non-limiting examples of suitable cross-sectional shapes for the insulation package 46 include semi-circular, triangular, teardrop, diamond, rectangular, square, rhomboid, hexagonal, and trapezoidal cross-sectional shapes. The first filler material 48 can be the same in each insulation package 46 or one or more of the insulation packages may include a first filler material 48 or combination of first filler materials 48 that is different than at least one of the other insulation packages 46.

According to an aspect of the present disclosure, the insulation packages 46 can be pre-compressed (also referred to as pre-compacted) prior to assembling the insulation packages 46 within the insulating cavity 40. The first filler material 48 within the envelope 49 can be pre-compressed prior to assembling the insulation packages 46 within the insulating cavity 40 such that the insulation packages 46 have a compressibility of from 0% to 20%. As used herein, the term compressibility refers to a measure of the volume change of the bulk solid (e.g., the first and/or second filler material 48, 50) as a function of a change in pressure. In other words, the bulk solid, in this case the first filler material 48, has been pre-compacted to a predetermined bulk density prior to assembling the insulation packages 46 within the insulating cavity 40. In some examples, the insulation packages 46 can be pre-compressed such that the insulation packages 46 exhibit 0% compressibility (i.e., no further change in bulk density) upon evacuating the insulating cavity 40 during formation of the vacuum insulated structure 10. In other examples, the insulation packages 46 can be pre-compressed by less than 100% such that the insulation packages 46 exhibit some degree of compressibility (i.e., a change in bulk density) upon evacuating the insulating cavity 40 during formation of the vacuum insulated structure 10. In some aspects of the present disclosure, the first filler material 48 can be pre-compressed such that the first filler material 48 has a compressibility of from about 0% to about 20% prior to assembling the insulation packages 46 within the insulating cavity 40. For example, the first filler material 48 can be pre-compressed to a compressibility of from about 0% to about 20%, about 0% to about 15%, about 0% to about 12%, about 0% to about 10%, about 0% to about 8%, about 0% to about 6%, about 0% to about 5%, about 0% to about 2%, about 0% to about 1%, about 0% to about 0.5%, about 0% to about 0.1%, about 0.1% to about 20%, about 0.1% to about 15%, about 0.1% to about 12%, about 0.1% to about 10%, about 0.1% to about 8%, about 0.1% to about 6%, about 0.1% to about 5%, about 0.1% to about 2%, about 0.1% to about 1%, about 0.1% to about 0.5%, about 0.5% to about 20%, about 0.5% to about 15%, about 0.5% to about 12%, about 0.5% to about 10%, about 0.5% to about 8%, about 0.5% to about 6%, about 0.5% to about 5%, about 0.5% to about 2%, about 0.5% to about 1%, about 1% to about 20%, about 1% to about 15%, about 1% to about 12%, about 1% to about 10%, about 1% to about 8%, about 1% to about 6%, about 1% to about 5%, about 1% to about 2%, about 5% to about 20%, about 5% to about 15%, about 5% to about 12%, about 5% to about 10%, about 5% to about 8%, or any compressibility value between these values. In some aspects, the insulation packages 46 can be pre-compressed such that the insulation packages 46 exhibit little to no change in their dimensions after evacuation of the insulating cavity 40 (i.e., they retain their shape). For example, the insulation packages 46 can be configured such that the dimensions of the insulation packages change by less than about 50%, less than about 40%, less than about 30%, less than about 20%, less than about 10, less than about 5%, or less than about 1% after evacuation of the insulating cavity 40.

In some aspects, a thickness Th of the insulation packages 46 (i.e., the dimension perpendicular to the inner liner 30 and the outer wrapper 32) and/or the degree to which the insulation packages 46 are pre-compressed can be selected to restrict inward movement of the inner liner 30 and/or outer wrapper 32 to less than a predetermined amount. For example, as illustrated in FIG. 3, the thickness Th of the insulation package 46 can correspond to a distance D between the assembled inner liner 30 and the outer wrapper 32 such that the insulation package 46 abuts an inner surface of the outer wrapper 32. The insulation package 46 can be pre-compressed such that the thickness Th of the insulation package 46 exhibits little to no change during evacuation of the insulating cavity 40. In this configuration, the insulation packages 46 can restrict inward movement of the inner liner 30 and/or outer wrapper 32 during evacuation. In another example, the insulation package 46 can have a thickness Th and/or compressibility that allows for a predetermined amount of inward movement of the inner liner 30 and/or outer wrapper 32 during evacuation of the insulating cavity 40. In some aspects, the insulation package 46 can be configured such that a final thickness $Th_{final}$ of the insulation package 46 after evacuating the insulating cavity 40 is within about 20% or less of an initial thickness $Th_{initial}$ of the insulation package 46 prior to evacuating the insulating cavity 40. For example, the final thickness $Th_{final}$ of the insulation package 46 can be within about 20% or less, within about 15% or less, within about 10% or less, within about 8% or less, within about 7% or less, within about 6% or less, within about 5% or less, within about 4% or less, within about 3% or less, within about 2% or less, within about 1% or less, or within about 0.5% or less of the initial thickness $Th_{initial}$ of the insulation package 46 prior to evacuating the insulating cavity 40.

Still referring to FIG. 3, the insulation packages 46 can be supported within the insulating cavity 40 by a seat 70 that is configured to receive the insulation package 46 therein and maintain the insulation package 46 within a desired position relative to the inner liner 30 and outer wrapper 32. In one example, the seat 70 is a distinct structure that is attached to the inner liner 30 (as illustrated in FIG. 3) and/or the outer wrapper 32. In another example, the seat 70 may be integrally formed with the inner liner 30 and/or the outer wrapper 32. The seat 70 can have suitable dimensions for retaining the insulation package 46 therein at least during assembly of the inner liner 30 and outer wrapper 32. Optionally, an adhesive, weld, and/or restraint (e.g., a flange or strap) may be used with the seat 70 to retain the insulation package 46 within the seat 70. Other mechanical support structures, such as hooks, fasteners, and clips, may be used alone or in combination with an adhesive or weld to support the insulation packages 46 within the insulating cavity 40. In other examples, an adhesive or weld alone may be used to support the insulation packages 46 within the insulating cavity 40. In yet another example, the thickness Th of the insulation packages 46 may be about equal to or slightly less than the distance D between the inner liner 30 and the outer wrapper 32 when assembled, such that the insulation packages 46 are held in place by the opposing pressure of the inner liner 30 and the outer wrapper 32 on the insulation packages 46.

The second filler material 50 can be any suitable material adapted to provide the vacuum insulated structure 10 with a desired insulation property. Non-limiting examples of suitable insulative materials for the second filler material 50 includes fumed silica, perlite, precipitated silica, aerogel powder, silicon carbide, carbon black powder, graphite, rice husk, ash powder, diatomaceous earth, cenospheres, glass fiber, glass microspheres, and combinations thereof. Optionally, the second filler material 50 can include one or more additives, non-limiting examples of which include opacifiers, colorants, electrical conductivity additives, radiant energy reflectivity additives, infrared absorbing additives, etc.

In some aspects, the first filler material 48 may be different than the second filler material 50 in chemical composition and/or in at least one physical property. In other aspects, the first filler material 48 and the second filler material 50 may have the same chemical composition and/or have at least one physical property that is the same. For example, the first filler material 48 can include an insulative material having the same chemical composition as the second filler material 50, but may have one or more different physical properties, such as a different bulk density, for example. In another example, the first filler material 48 and the second filler material 50 can include an insulative filler material of the same chemical composition, but the first and/or second filler material 48, 50 can include one or more additives to provide the first and second filler material 48, 50 with at least one physical property that is the same or different, examples of which include bulk density, opacity, color, electrical conductivity, radiant energy reflectivity, infrared energy absorption, etc. In yet another example, the first filler material 48 and the second filler material 50 can include an insulative filler material having a different chemical composition, but the first and/or second filler material 48, 50 can include one or more additives to provide the first and second filler material 48, 50 with at least one physical property that is the same, examples of which include bulk density, opacity, color, electrical conductivity, radiant energy reflectivity, infrared energy absorption, etc. In another example, the second filler material 50 can include a material or a combination of materials, at least one of which is not present within the insulation packages 46 such that the first and second filler material 48, 50 differ in chemical composition and/or at least one physical property. In one exemplary example, the first filler material 48 in the insulation packages 46 can include a combination of fumed silica and carbon black and the second filler material 50 can include perlite.

The insulation packages 46 can be disposed within the insulating cavity 40 to provide space between adjacent insulation packages 46 for the second filler material 50 to be disposed. In some aspects, the second filler material 50 can be supplied into the insulating cavity 40 such that the second filler material 50 surrounds at least a portion of the insulation packages 46 within the insulating cavity 40 and in some examples may surround all of the insulation packages 46. The number, cross-sectional shape, dimensions, pattern, and/or spacing of the insulation packages 46 within the insulating cavity 40 can be selected to provide a predetermined volume which can be filled with the second filler material 50 to provide the vacuum insulated structure 10 with a desired characteristic, such as a desired thermal conductivity. In another example, the number, cross-sectional shape, dimensions, pattern, and/or spacing of the insulation packages 46 within the insulating cavity 40 can be selected to facilitate distribution of the second filler material 50 within the insulating cavity 40.

The number, cross-sectional shape, dimensions, pattern, and/or spacing of the insulation packages 46 within the insulating cavity 40 can be selected at least based in part on a desired thermal conductivity of the vacuum insulated structure 10, the characteristics of the first and/or second filler material 48, 50, the final pressure within the vacuum insulated structure 10, and/or the characteristics of the material used to form the inner liner 30 and/or outer wrapper 32. For example, the relative amounts of the second filler material 50 and the first filler material 48 (based on the number and dimensions of the insulation packages 46) can be selected at least in part based on a desired thermal conductivity of the vacuum insulated structure 10. In another example, the number, cross-sectional shape, dimensions, pattern, and/or spacing of the insulation packages 46 can be selected to prevent deformation of the inner liner 30 and/or outer wrapper 32 during evacuation of the insulating cavity 40. Any one or more characteristics of the vacuum insulated structure 10, such as the desired thermal conductivity of the vacuum insulated structure 10, the characteristics of the first and/or second filler material 48, 50, the final pressure within the vacuum insulated structure 10, and/or the characteristics of the material used to form the inner liner 30 and/or outer wrapper 32, can be selected in concert with one or more additional characteristics to provide the vacuum insulated structure 10 with the desired thermal conductivity, final vacuum pressure, and/or structural strength.

In some aspects, the insulation packages 46 can be spaced within the insulating cavity 40 according to any regular or irregular pattern. In some examples, the number, cross-sectional shape, dimensions, and/or spacing of the insulation packages 46 can be selected at least in part to facilitate supplying the insulating cavity 40 with a desired amount of the second filler material 50, and optionally to facilitate dispersion of the second filler material 50 within the insulating cavity 40. In some examples, the number, cross-sectional shape, dimensions, and/or spacing of the insulation packages 46 can be selected in concert with the second filler material 50 to provide the vacuum insulated structure 10 with the desired thermal conductivity. The cross-sectional shape, dimensions, and/or spacing of the insulation packages 46 can be consistent throughout the insulating cavity 40 or one or more of the cross-sectional shape, dimensions, and/or spacing of the insulation packages 46 may vary within the insulating cavity 40.

The hybrid insulation structure including the insulation packages 46 containing the first filler material 48 and the second filler material 50 can be used to address several challenges associated with forming vacuum insulated structures. In some aspects, the insulation packages 46 can act as spacers to facilitate maintaining a predetermined distance D between the inner liner 30 and outer wrapper 32 during and after the vacuum is drawn in the insulating cavity 40. Maintaining a predetermined distance D between the inner liner 30 and outer wrapper 32 can inhibit or minimize deformation of the inner liner 30 and/or outer wrapper 32 that can result as the pressure in the insulating cavity 40 is decreased. The insulation packages 46 can be filled with a first filler material 48 that can provide a predetermined degree of thermal insulation. In this manner, the insulation packages 46 can act as both a spacer and structural support within the insulating cavity 40 as well as contribute to the thermal insulation of the vacuum insulated structure 10.

Deformation of the inner liner 30 and outer wrapper 32 during evacuation (also referred to as vacuum bow) can be challenging to address when forming vacuum insulated structures, particularly larger vacuum insulated structures, such as refrigerator cabinets, for example. In a conventional vacuum insulated structure, an insulating filler material is supplied into the insulating cavity of the appliance, often while the parts are being vibrated to facilitate distribution of the insulating filler material. However, this method can result in a density gradient within the insulating cavity that can result in uneven compaction of the insulating filler material within the insulating cavity. As the density of the insulating filler material decreases and/or the compressibility of the material increases, the likelihood of vacuum bow occurring during evacuation of the insulating cavity increases. However, the use of high density insulating filler material and/or insulating filler material having a lower compressibility may undesirably affect the thermal conductivity of the structure. The hybrid insulation system described herein including the insulation packages 46 and the second filler material 50 provide additional opportunities to address these challenges while still forming a vacuum insulated structure having the desired thermal conductivity. For example, the insulation packages 46 can be configured to inhibit or decrease vacuum bow, thus allowing for the use of a wider range of materials in the second filler material 50, such as lower density and/or higher compressibility materials. In another example, the insulation packages 46 can facilitate the use of materials in the second filler material 50 that have a higher flowability and which otherwise might not be useable due to the likelihood of vacuum bow during evacuation. These higher flowability materials can facilitate a more uniform distribution of the second filler material 50 within the insulating cavity 40. For example, perlite is an example of material that can be used in the second filler material 50 which has a higher flowability (compared to fumed silica, for example), but which can be challenging to use due to the likelihood of vacuum bow during evacuation. The insulation packages 46 can facilitate the use of materials having a high flowability, such as perlite, while decreasing the likelihood of vacuum bow during evacuation. For example, the second filler material 50 can include perlite, which has a high flowability and is often a relatively low cost material, in combination with insulation packages 46 that include a combination of fumed silica and carbon black as the first filler material 48, to provide a vacuum insulated structure having a thermal conductivity suitable for use in a refrigeration appliance.

Figure 4:
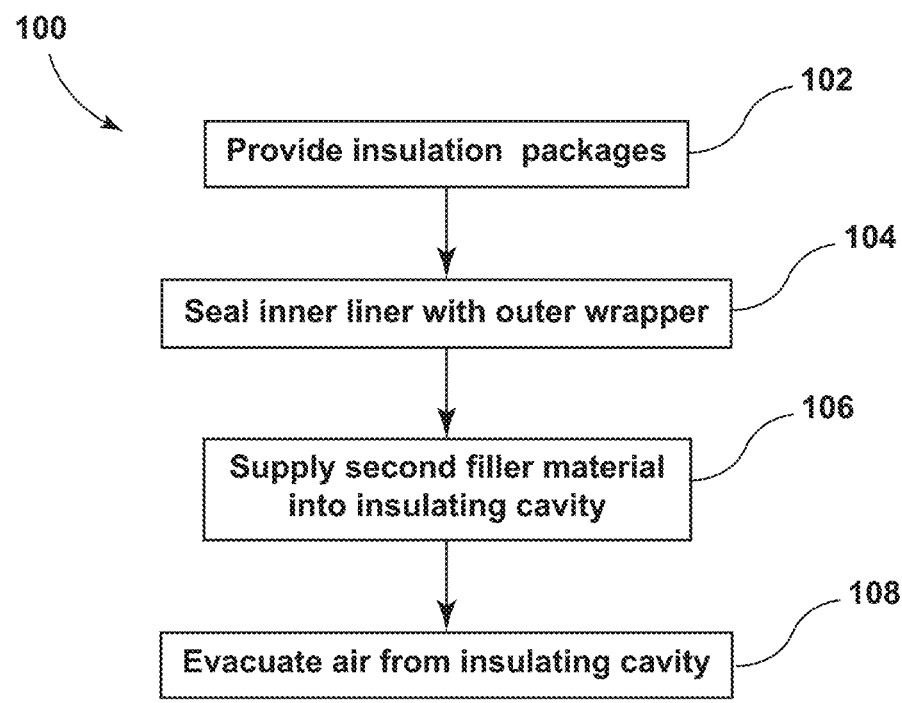
FIG. 4 is flow chart illustrating a method of forming a vacuum insulated structure, according to the present disclosure.

FIG. 4 illustrates a method 100 for forming a vacuum insulated structure 10 containing the insulation system 44 according to aspects of the present disclosure. The method 100 can be used to form an insulation system 44 for use in the vacuum insulated structures 10, 10a, and/or 10b of FIGS. 1-2, and any other vacuum insulated structure suitable for use in insulating an appliance.

The method 100 of FIG. 4 includes providing a plurality of insulation packages 46 at step 102. The number, cross-sectional shape, dimensions, pattern, spacing, and the first filler material 48 of the insulation packages 46 can be selected as described above based on the intended application of the vacuum insulated structure 10. The insulation packages 46 can be formed as part of the method 100 or may be formed in a separate process, optionally at a different facility. The insulation packages 46 can be formed and pre-compressed according to any suitable process. One exemplary method of forming the insulation packages 46 includes filling the envelope 49 with a first filler material 48 that has optionally been combined with one or more additives. The first filler material 48 can be sealed within the envelope 49 by sewing and/or by using an adhesive or weld to close the envelope 49 and retain the first filler material therein. The cross-sectional shape and dimensions of the envelope 49 can correspond to the desired final cross-sectional shape and dimensions of the insulation package 46. The filled envelope 49 can be placed within a mold and compacted using a hydraulic press to pre-compress the first filler material 48 to a desired compressibility. The insulation packages 46 can be coupled with the inner liner 30 or the outer wrapper 32 using a mechanical support structure, adhesive, weld, and/or the seat 70, as described above. Optionally, the insulation packages 46 can be retained between the inner liner 30 and the outer wrapper 32 by spacing the inner liner 30 and the outer wrapper 32 from one another such that the distance D between the inner liner 30 and the outer wrapper 32 is about equal to or less than the thickness Th of the insulation packages 46.

Optionally, the method 100 can include forming a plurality of seats 70 in the inner liner 30 and/or outer wrapper 32 to provide a support structure for retaining the insulation package 46 relative to the inner liner 30 and outer wrapper 32. In one aspect, seats can be integrally formed in the inner liner 30 and/or outer wrapper 32 by a molding or stamping process, for example. In another aspect, as described above, the seats 70 can be coupled with the inner liner 30 or outer wrapper 32 using a mechanical fastener, an adhesive, and/or a weld. The seats 70 can be formed as part of the method 100 or may be formed as part of a separate process, optionally a process that occurs at a different facility.

The inner liner 30 can be sealed with the outer wrapper 32 at step 104 such that the walls of the inner liner 30 are spaced from the adjacent walls of the outer wrapper 32 to form the insulating cavity 40. The trim breaker 34 can be coupled with the open ends of the inner liner 30 and the outer wrapper 32 to seal the insulating cavity 40. In some embodiments, the open ends of the inner liner 30 and the outer wrapper 32 include flanges that can be coupled to seal the insulating cavity 40 in addition to or as an alternative to the trim breaker 34. Sealing the inner liner 30, outer wrapper 32, and optional trim breaker 34 can include any suitable combination of welds, adhesives, gaskets, seals, and/or connecting structures.

The second filler material 50 can be supplied into the sealed insulating cavity 40 through one or more filling ports at step 106. The second filler material 50 can be supplied into the insulating cavity 40 such that the second filler material 50 at least partially surrounds the insulation packages 46. The number, cross-sectional shape, dimensions, pattern, and/or spacing of the insulation packages 46 can be selected to facilitate distribution of the second filler material within the insulating cavity 40. The filled insulating cavity 40 can then be evacuated through one or more evacuation ports at step 108 to create a vacuum chamber within the insulating cavity 40. For example, the insulating cavity 40 can be fluidly coupled with an external vacuum system to draw air from the insulating cavity 40 to obtain a lower pressure within the insulating cavity 40 relative to ambient pressure (i.e., form a vacuum insulated structure). The vacuum insulated structures 10a and 10b used with the first and second insulated doors 20 and 22 can be formed in a similar manner. The lower pressure generated within the insulating cavity 40 during evacuation can cause the inner liner 30 and/or the outer wrapper 32 to bend inward. The insulation packages 46 can be configured to abut adjacent areas of the inner liner 30 and the outer wrapper 32 at least during evacuation to restrict the degree to which the inner liner 30 and/or the outer wrapper 32 can bend inward. In this manner, the insulation packages 46 can inhibit the deformation of the inner liner 30 and/or the outer wrapper 32 that can occur due to bending of these structures during evacuation of the insulating cavity 40.

In other embodiments, the vacuum insulated structures 10, 10a, and/or 10b can be in the form of individual vacuum insulated panels having an inner liner and an outer wrapper defining an insulating cavity including the insulation packages 46 and the second filler material 50. These vacuum insulated panels can then be inserted within the insulating cavities 40, 56, and/or 64 of the cabinet body 42, first insulated door assembly 20, and/or second insulated door assembly 22, respectively.

The following non-limiting aspects are encompassed by the present disclosure. To the extent not already described, any one of the features of the first through the twentieth aspects may be combined in part or in whole with features of any one or more of the other aspects of the present disclosure to form additional aspects, even if such a combination is not explicitly described.

According to a first aspect of the present disclosure, a vacuum insulated structure, includes: an inner liner; an outer wrapper coupled to the inner liner and defining an insulating cavity; and a plurality of insulation packages disposed within the insulating cavity, wherein each insulation package comprises a first filler material contained within an envelope; and a second filler material disposed within the insulating cavity.

According to a second aspect of the present disclosure, the vacuum insulated structure of aspect 1, wherein the plurality of insulation packages are coupled with at least one of the inner liner and outer wrapper by an adhesive, weld, hook, mechanical fastener, clip, or combinations thereof.

According to a third aspect of the present disclosure, the vacuum insulated structure of any one of the preceding aspects 1-2, wherein at least one of the inner liner and outer wrapper include a plurality of seats for supporting each of the plurality of insulation packages between the inner liner and outer wrapper.

According to a fourth aspect of the present disclosure, the vacuum insulated structure of any one of the preceding aspects 1-3, wherein each of the plurality of insulation packages extends between the inner liner and the outer wrapper.

According to a fifth aspect of the present disclosure, the vacuum insulated structure of any one of the preceding aspects 1-4, wherein the second filler material surrounds at least a portion of the plurality of insulation packages.

According to a sixth aspect of the present disclosure, the vacuum insulated structure of any one of the preceding aspects 1-5, wherein the first filler material, the second filler material, or both comprise at least one material selected from fumed silica, perlite, precipitated silica, aerogel powder, silicon carbide, carbon black powder, graphite, rice husk, ash powder, diatomaceous earth, glass fiber, glass microspheres, and cenospheres.

According to a seventh aspect of the present disclosure, the vacuum insulated structure of any one of the preceding aspects 1-6, wherein each of the plurality of insulation packages are pre-compacted.

According to an eighth aspect of the present disclosure, the vacuum insulated structure of any one of the preceding aspects 1-7, wherein the plurality of insulation packages are spaced within the insulating cavity in an irregular pattern.

According to a ninth aspect of the present disclosure, the vacuum insulated structure of any one of the preceding aspects 1-8, wherein the plurality of insulation packages have a cross-sectional geometry that is one of circular, semicircular, triangular, teardrop, diamond, rectangular, square, rhomboid, hexagonal, trapezoidal, or combinations thereof.

According to a tenth aspect of the present disclosure, the vacuum insulated structure of any one of the preceding aspects 1-9, wherein the inner liner defines at least a portion of an interior of a home appliance, and wherein the outer wrapper defines at least one exterior wall of the home appliance.

According to a eleventh aspect of the present disclosure, a method of forming a vacuum insulated structure includes: sealing an inner liner with an outer wrapper to form an insulating cavity, wherein a plurality of insulation packages are disposed within the insulating cavity, each of the plurality of insulation packages comprising a first filler material contained within an envelope; supplying a second filler material to the insulating cavity through at least one filling port; and evacuating air from the insulating cavity through at least one vacuum port.

According to a twelfth aspect of the present disclosure, the method of aspect 11, further comprising: prior to the sealing an inner liner with an outer wrapper, coupling each of the plurality of insulation packages to one of the inner liner or the outer wrapper by an adhesive, weld, hook, mechanical fastener, clip, or combinations thereof.

According to a thirteenth aspect of the present disclosure, the method of any one of the previous aspects 11-12, further comprising: prior to the sealing an inner liner with an outer wrapper, forming a plurality of seats in at least one of the inner liner and the outer wrapper, wherein the seats are configured to receive each of the plurality of insulation packages.

According to a fourteenth aspect of the present disclosure, the method of any one of the preceding aspects 11-13, further comprising: prior to the sealing an inner liner with an outer wrapper, supplying the first filler material into the envelope and compacting the first filler material within the envelope.

According to a fifteenth aspect of the present disclosure, the method of any one of the preceding aspects 11-14, wherein the first filler material, the second filler material, or both comprise at least one material selected from fumed silica, perlite, precipitated silica, aerogel powder, silicon carbide, carbon black powder, graphite, rice husk, ash powder, diatomaceous earth, glass fiber, glass microspheres, and cenospheres.

According to a sixteenth aspect of the present disclosure, the method of any one of the preceding aspects 11-15, wherein the supplying a second filler material comprises filling the insulating cavity surrounding the plurality of insulation packages with the second filler material.

According to a seventeenth aspect of the present disclosure, a hybrid insulation structure includes: an inner liner sealed with an outer wrapper to form an insulating cavity; a plurality of insulation packages disposed within the insulating cavity and extending between the inner liner and the outer wrapper, wherein each insulation package comprises a first filler material contained within an envelope; and a second filler material disposed within the insulating cavity and surrounding the plurality of insulation packages, wherein the second filler material is different than the first filler material.

According to an eighteenth aspect of the present disclosure, the hybrid insulation structure of aspect 17, wherein the inner liner and outer wrapper are configured to be received within an external cavity of a home appliance.

According to a nineteenth aspect of the present disclosure, the hybrid insulation structure of any one of the preceding aspects 17-18, wherein a pressure inside the insulating cavity is less than ambient pressure.

According to a twentieth aspect of the present disclosure, the hybrid insulation structure of any one of the preceding aspects 17-19, wherein the plurality of insulation packages have a cross-sectional geometry that is one of circular, semicircular, triangular, teardrop, diamond, rectangular, square, rhomboid, hexagonal, trapezoidal, or combinations thereof.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vacuum insulated structure, comprising:
an inner liner;
an outer wrapper coupled to the inner liner and defining an insulating cavity;
a plurality of insulation packages disposed within the insulating cavity, wherein each insulation package comprises a first filler material contained within an envelope, and wherein the plurality of insulation packages are arranged to define a plurality of adjacent offset columns; and
a second filler material disposed within the insulating cavity, wherein the second filler material is positioned between adjacent ones of the plurality of insulation packages such that the second filler material extends between each of the adjacent ones of the plurality of insulation packages, and wherein each of the plurality of insulation packages extends from the inner liner toward the outer wrapper.

2. The vacuum insulated structure of claim 1, wherein the plurality of insulation packages are coupled with at least one of the inner liner and outer wrapper by an adhesive, weld, hook, mechanical fastener, clip, or combinations thereof.

3. The vacuum insulated structure of claim 1, wherein at least one of the inner liner and outer wrapper include a plurality of seats for supporting each of the plurality of insulation packages between the inner liner and outer wrapper.

4. The vacuum insulated structure of claim 1, wherein each of the plurality of insulation packages extends between the inner liner and the outer wrapper.

5. The vacuum insulated structure of claim 4, wherein each of the plurality of insulation packages directly abuts the inner liner and the outer wrapper.

6. The vacuum insulated structure of claim 1, wherein the second filler material surrounds surfaces of the plurality of insulation packages that are non-parallel with the inner liner.

7. The vacuum insulated structure of claim 1, wherein the first filler material, the second filler material, or both comprise at least one material selected from fumed silica, perlite, precipitated silica, aerogel powder, silicon carbide, carbon black powder, graphite, rice husk, ash powder, diatomaceous earth, glass fiber, glass microspheres, and cenospheres.

8. The vacuum insulated structure of claim 1, wherein the plurality of insulation packages are spaced within the insulating cavity in an irregular pattern.

9. The vacuum insulated structure of claim 1, wherein the inner liner defines at least a portion of an interior of a home appliance, and wherein the outer wrapper defines at least one exterior wall of the home appliance.

10. The vacuum insulated structure of claim 1, wherein each of the plurality of insulation packages restricts bending of the inner liner and the outer wrapper toward each other.

11. The vacuum insulated structure of claim 1, wherein the second filler material extends between vertically adjacent ones of the plurality of insulation packages, and wherein the second filler material extends between horizontally adjacent ones of the plurality of insulation packages.

12. The vacuum insulated structure of claim 11, wherein the plurality of insulation packages and the second filler material occupy an entirety of the insulating cavity.

13. A vacuum insulated structure comprising:
an inner liner;
an outer wrapper coupled to the inner liner and defining an insulating cavity;
a plurality of insulation packages disposed within the insulating cavity, wherein each insulation package comprises a first filler material contained within an envelope; and
a second filler material disposed within the insulating cavity, wherein the insulation packages and the second filler material are arranged in an alternating pattern within the insulating cavity such that the plurality of insulation packages are arranged to define a plurality of adjacent offset columns, wherein the plurality of insulation packages and the second filler material alternate in a horizontal direction and a vertical direction within the insulating cavity, and wherein the plurality of insulation packages and the second filler material occupy an entirety of the insulating cavity.

14. The vacuum insulated structure of claim 13, wherein each of the plurality of insulation packages restricts bending of the inner liner and outer wrapper toward each other.

15. The vacuum insulated structure of claim 13, wherein each of the plurality of insulation packages are pre-compacted.

16. A vacuum insulated structure comprising:
an inner liner;
an outer wrapper coupled to the inner liner and defining an insulating cavity, wherein a distance between the inner liner and the outer wrapper defines a thickness of the insulating cavity;
a plurality of insulation packages disposed within the insulating cavity, wherein each insulation package comprises a first filler material contained within an envelope, and wherein the plurality of insulation packages are arranged to define a plurality of adjacent offset columns;
a plurality of seats coupled to at least one surface chosen from the inner liner and the outer wrapper, wherein each of the plurality of seats supports one of the plurality of insulation packages such that a plurality of seat-package pairs are defined, and wherein a thickness of each of the plurality of seat-package pairs equals the thickness of the insulating cavity; and
a second filler material disposed within the insulating cavity, wherein the second filler material directly abuts at least one of the inner liner and the outer wrapper between adjacent ones of the plurality of seats, wherein the second filler material is positioned between adjacent ones of the plurality of seat-package pairs such that the second filler material extends between each of the adjacent ones of the plurality of seat-package pairs in a vertical direction and a horizontal direction within the insulation cavity.

17. The vacuum insulated structure of claim 16, wherein the second filler material surrounds at least a portion of the plurality of insulation packages.

18. The vacuum insulated structure of claim 16, wherein each of the plurality of insulation packages restricts bending of the inner liner and the outer wrapper toward each other.

19. The vacuum insulated structure of claim 16, wherein the plurality of insulation packages and the second filler material are arranged in an alternating pattern within the insulating cavity.

20. The vacuum insulated structure of claim 16, wherein the second filler material occupies an entirety of a space between adjacent ones of the plurality of seat-package pairs.

\* \* \* \* \*